United States Patent [19]
Boothe et al.

[11] 3,853,529
[45] Dec. 10, 1974

[54] PLEATED AIR FILTER CARTRIDGE

[75] Inventors: Clyde O. Boothe, Rolling Hills Estates; Robert M. Culbert, Manhattan Beach; Richard S. Farr, Los Angeles, all of Calif.

[73] Assignee: Farr Company, El Segundo, Calif.

[22] Filed: June 9, 1971

[21] Appl. No.: 151,455

[52] U.S. Cl.................. 55/499, 55/514, 55/521, 210/493
[51] Int. Cl............................................ B01d 27/06
[58] Field of Search............ 55/486, 487, 497–500, 55/514, 521; 210/493

[56] References Cited
UNITED STATES PATENTS

| | | | |
|---|---|---|---|
| 2,008,800 | 7/1935 | Somens | 55/497 |
| 3,177,637 | 4/1965 | Davis | 55/499 |
| 3,243,943 | 4/1966 | Getzin | 210/493 |
| 3,246,457 | 4/1966 | DeBaun | 210/493 |
| 3,494,113 | 2/1970 | Kinney | 55/486 |
| 3,659,402 | 5/1972 | Alliger | 210/499 |

FOREIGN PATENTS OR APPLICATIONS

| | | | |
|---|---|---|---|
| 1,358,867 | 3/1964 | France | 55/499 |
| 781,194 | 8/1957 | Great Britain | 55/499 |
| 710,516 | 6/1954 | Great Britain | 210/493 |

*Primary Examiner*—Bernard Nozick
*Attorney, Agent, or Firm*—Lyon & Lyon

[57] ABSTRACT

A disposable filter cartridge for mounting in an air inlet duct is manufactured from inexpensive materials according to a relatively rapid and automated method. A web of wire supports secured to one side of a flexible sheet of filtering media is folded and cut to form a plurality of panels of pleated filtering media having an integral support structure. The completed cartridge consists of a panel mounted in a frame with the sides and edges of the filtering media sealed to the frame to prevent a by-pass of air therebetween.

11 Claims, 8 Drawing Figures

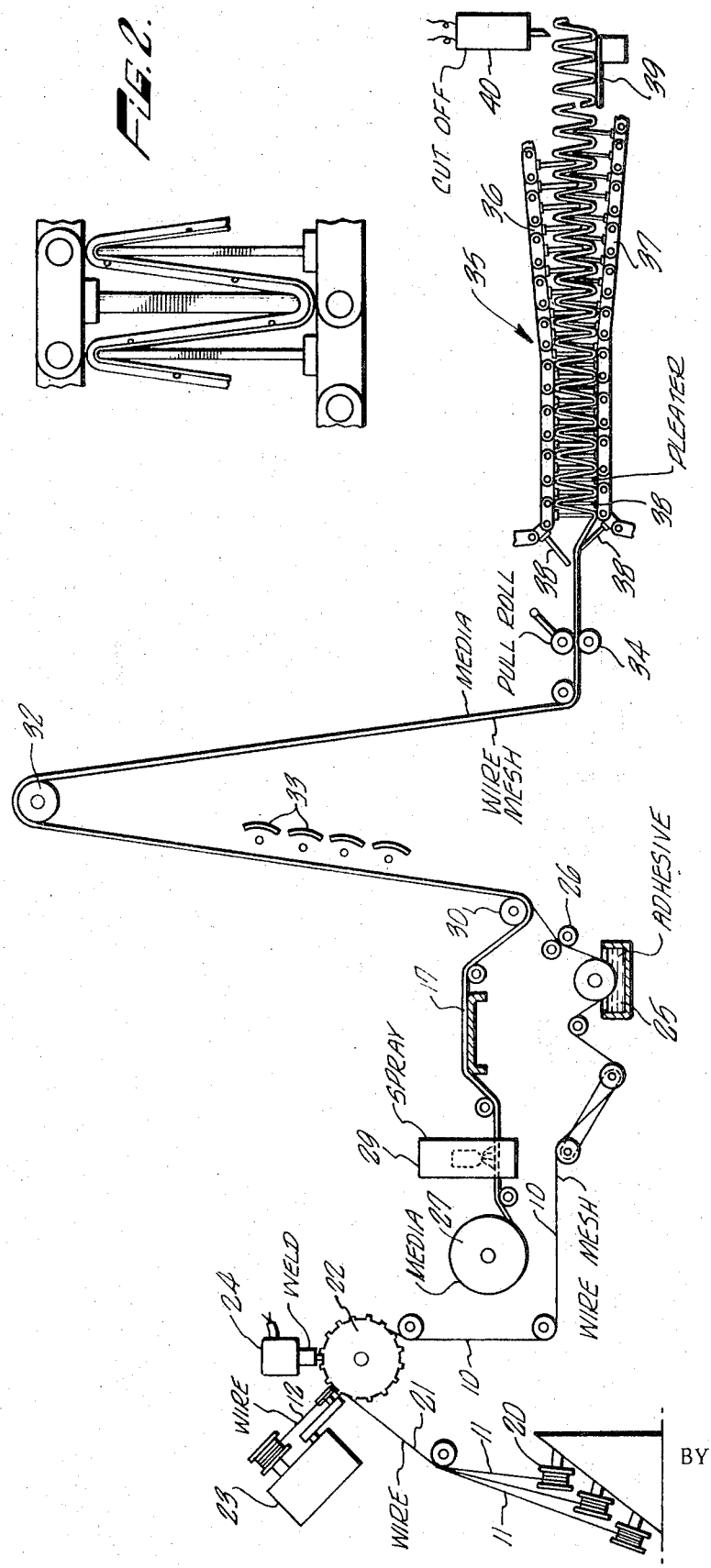

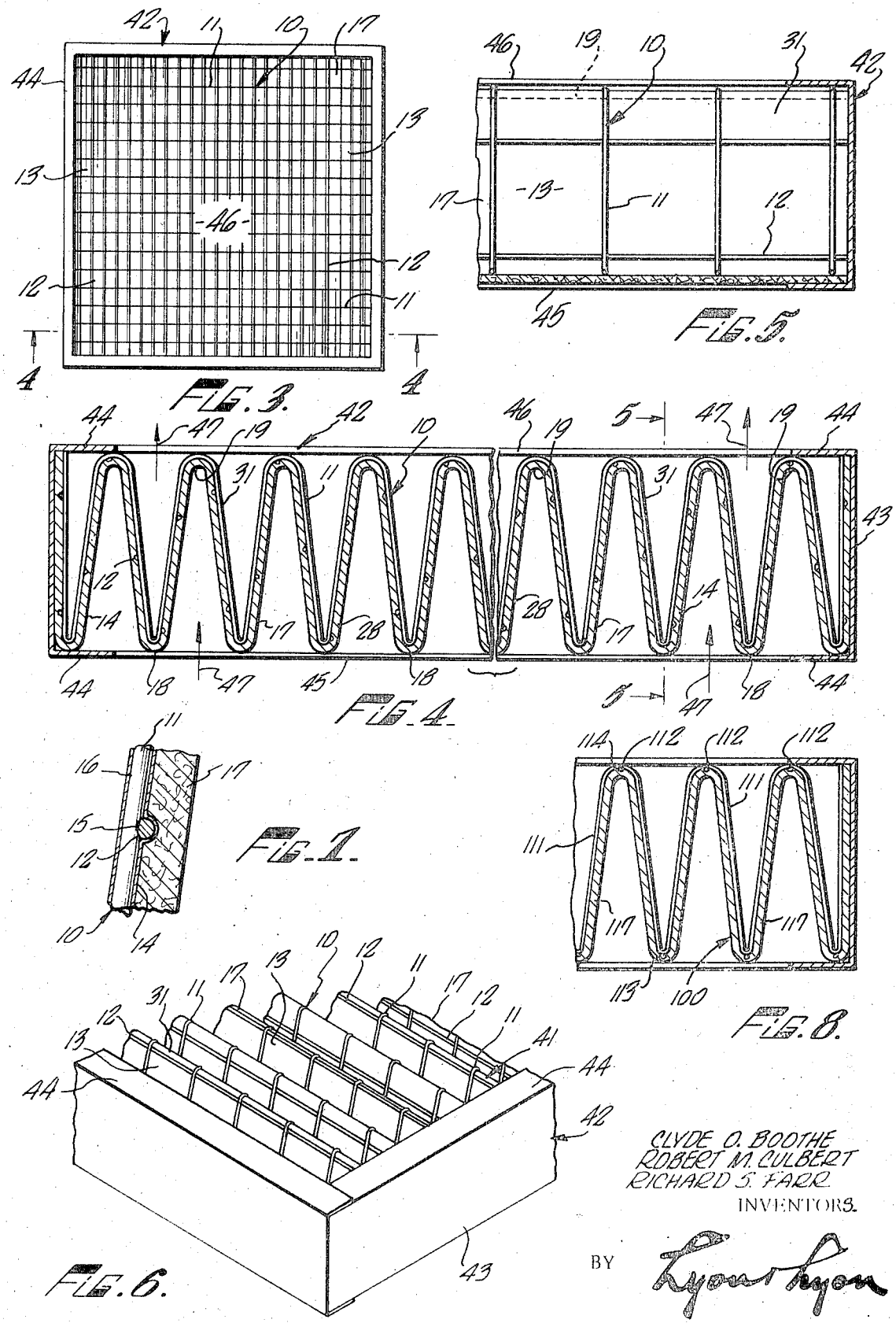

PLEATED AIR FILTER CARTRIDGE

This invention relates to air filters and the method of making air filters used in removing foreign materials from air entering an inlet duct to an air conditioning system or other type of air supply system and, in particular, is directed to a self-contained air filter cartridge having a pleated filter media with an integral support structure which is sufficiently inexpensive in its manufacture to be entirely disposable after use.

In most air conditioning and air supply systems, it is generally desirable to filter some of the foreign materials such as dust or dirt particles out of the air which is being supplied to the system. The amount of foreign material desired to be extracted from the incoming air or correspondingly the amount of foreign material which is tolerable in the particular air conditioning or supply system will dictate the particular type of filtering media which must be used. If only relatively large particles need to be eliminated a filter utilizing wire screen media may be adequate, whereas if relatively fine dust particles must be removed from the incoming air the filter media must normally consist of such materials as cloth-backed cotton, polyurethane foam, glass-coated cloth, spun nylon, and the like.

A further problem in the filtration of air is that the foreign material extracted from the incoming air accumulates and the filtering media eventually becomes sufficiently clogged or loaded with dirt that its resistance to air flow becomes excessive. When this occurs, the media must be either replaced or cleaned. This problem is aggravated in the case of filter media of the types described which are effective for the finer dirt particles. With most types of such media, it is impractical to clean the same and it therefore has become relatively common to use inexpensive disposable filter cartridges.

Filtering materials which provide reasonable efficiencies in the removal of the relatively finer foreign particles have relatively high resistance to the flow of air therethrough. As a result it is generally desirable to provide an area of filtering media for the air to flow through which is greater than the area of the air inlet duct to the air conditioning or supply system. To accomplish this, it is common practice to corrugate or pleat the filtering media thereby increasing the area of filtering media through which the air may flow. Most types of filtering media which are effective against finer dirt particles are not sufficiently rigid to be self-supporting in this corrugated or pleated configuration, with the result that some apparatus must be supplied to support the filtering media.

Various expedients have been used to provide this support, including permanent wire baskets, permanent rigid frameworks which carry supporting wires, and various integral support structures which are disposable in conjunction with the clogged media. The permanent support structures are, of course, more expensive to manufacture and also present problems during the removal and the installation of the filtering media. The least expensive and most widely used support structures have been various card board frameworks, which together with the filtering media form a self-contained disposable cartridge. Such cartridges, however, in certain installations are objectionable because of the flammable nature of the cardboard. Certain of such cartridges are also objectionable because the cardboard supports crossing over the filter media and offering support thereto are relatively large for strength purposes and therefore reduce the effective surface area of the filtering media through which the air flows. Air filter cartridges having an integral support structure of a non-flammable material heretofore used have been less than satisfactory for several reasons including a lack of sufficient strength in the support structure, the support structure is subject to rusting, the support structure and filtering media are not properly joined together, and/or the entire filter cartridge is difficult and expensive to manufacture.

In order for a filtering cartridge to be sufficiently inexpensive to be disposable after replacement, the materials used must be inexpensive, the quantity of materials minimized, and the manufacture of the cartridge must be relatively rapid and inexpensive. In accordance with the present invention, there is provided a self-contained disposable filter cartridge which is relatively efficient against finer dirt particles. This cartridge incorporates inexpensive materials which may be inexpensively assembled. Further, the filtering media is sufficiently supported in its pleated condition to obtain a maximum effective area of filtering media for a given size of filter cartridge consistent with a low resistance to air flow through the filter cartridge.

Accordingly it is a principal object of this invention to provide a novel form of self-contained pleated air filtering cartridge which is sufficiently inexpensive to be disposable.

Another object of this invention is to provide a novel form of disposable pleated filter cartridge wherein the pleats of the media are adequately supported with a minimal reduction of the effective area of filtering media.

A more detailed object of this invention is to provide a pleated disposable filter cartridge using straight and sinuous wire supports which are secured to the filtering material to effectively support each pleat both laterally and longitudinally.

A still further object of this invention is to provide a pleated disposable filter cartridge utilizing an integral support structure which is both fire resistant and rust resistant.

Another object of this invention is to provide a method for making a pleated filter cartridge having an integral support structure which is relatively rapid and automated and produces a structurally sound and inexpensive filter cartridge.

Still another object of this invention is to provide a method for making a self-contained, disposable pleated air filter cartridge wherein the steps for making may be performed inexpensively.

Other and more detailed objects and advantages of this invention will appear from the following description and the accompanying drawings.

In the drawings:

FIG. 1 is a schematic elevation view of the apparatus and method of this invention for forming a web of wire supports, applying the web to filtering material, and pleating the combination.

FIG. 2 is an enlarged fragmentary side view of the pleating components.

FIG. 3 is a view of the outlet or downstream end of the filter cartridge.

FIG. 4 is a sectional view of the assembled filter cartridge taken substantially on the line 4—4 of FIG. 3 and illustrating the pleated filtering media and the integrated support structure.

FIG. 5 is a sectional view taken substantially on the line 5—5 of FIG. 4.

FIG. 6 is a fragmentary perspective view of the assembled filter cartridge illustrating the downstream end of the cartridge.

FIG. 7 is a fragmentary sectional view illustrating the connection of one of the sinuous wire supports with a straight wire support and the joining of the two supports with the filtering media.

FIG. 8 is a fragmentary sectional view similar to FIG. 4 illustrating a modified form of the support structure of this invention.

Referring now to the drawings, means are provided for supporting the filtering media and, as shown, these means may comprise a web, generally designated 10. The web 10 is preferably metallic to be non-flammable and comprises a plurality of spaced, sinuous wire strands or supports 11 which extend parallel to each other in a common plane and a plurality of parallel straight wire strands or supports 12 which extend perpendicular to the sinuous wire supports 11 and are connected thereto. Typically, the sinuous wire strands are equally spaced, but in certain instances it may be advantageous to vary the spacing between certain of the wire strands. The straight wire supports 12 extend across the sinuous wire supports 11 in randomly spaced parallel planes, but the intersections of the straight wire supports 12 on the sinuous wire supports 11 are also typically equally spaced apart. Thus, the intersecting wire supports 11 and 12 define a plurality of rectangular apertures 12 in the web, with each aperture 13 in the web normally having the same cross-sectional area.

In contrast to a more expensive woven web of intersecting wire strands, the straight wire supports 12 of the web 10 of this invention all extend across and intersect only one side of the sinuous wire supports 11. This side of the sinuous wire supports 11 might best be described as the inside surface of each sinuous support and is generally designated 14. Each straight wire support 12 and each sinuous wire support 11 are connected at their intersection by a weld 15. The entire web 10 is coated with an adhesive 16 which is adapted to join the web 10 and a sheet of filtering material 17, as best seen in FIG. 6, and which is further adapted to protect the metallic web 10 against rusting. In addition the coating of the entire web 10 with adhesive provides a complete seal around each aperture 13 which in turn prevents the filtering material 17 from being urged through the apertures by the flow of air. One adhesive found to be particularly desirable is a modified polyvinyl acetate emulsion, compounded to produce a moisture resistant film on the web. However, this adhesive is substantially water soluble and is therefore easily removed during cleaning of the equipment. Another particularly desirable adhesive is a polyvinyl chloride plastisol. This adhesive has a tendency to encapsulate rather than actually adhere to the wire. This adhesive also has very good water resistant qualities and in addition is easily applied to the web on a continuous basis because it is not a volatile mixture and therefore remains at same consistency throughout the period of use.

If there is an insufficient seal around the apertures 13 and/or if the wire supports are spaced too far apart to provide sufficient support for the filtering material 17, then the filtering material 17 will billow through the apertures 13 to such an extent that the filtering material will contact the filtering material billowing through adjacent apertures 13 and thereby greatly reduce the filtering surface area of the filtering material 17. However, it is important to note that the wire supports 11 and 12 of the web 10 of this invention are spaced sufficiently far apart to prevent the adhesive from bridging across the wire supports during the coating process and cover the apertures 13. It has been found that a one inch space between each of the parallel sinuous wire supports 11 and a one inch space between each of the parallel straight wire supports 12 provides adequate support to the filtering material 17 without interfering with the adhesive coating process. It should also be noted that the sinuous wire supports 11 are bent in such a manner to provide a media with more acute upstream folds or peaks 18 than the downstream folds or valleys 19. This enhances the dirt or dust collecting capacity of the filter media.

Referring now more particularly to FIG. 1, an apparatus is schematically shown for forming the support web 10, assembling the web 10 and filtering material or filter media 17, and folding the assembly. However, it is to be understood that my filter cartridge could be manually manufactured or the apparatus shown could be materially modified or different apparatus substituted for accomplishing the same steps of the method of this invention without departing from the scope of the invention. The support wires 11 are carried on a plurality of individual supply rolls 20 and fed continuously in spaced parallel rows 21 across a welding roll 22. The support wires 12 are carried on a reciprocating supply roll 23 and are fed back and forth in spaced parallel rows over the support wires 11 on the welding roll 22. The parallel row of support wires 12 intersect the parallel rows of support wires 11 on the welding roll 22 at right angles and a welding machine 24 welds the intersecting support wires 11 and 12 together to form the wire support web or mesh 10.

This web 10 is then passed through an adhesive bath 25 where it is completely covered by an adhesive. As heretofore described, this complete covering of adhesive over the wire support web 10 protects the web 10 against rusting and offers a continuous seal between the web 10 and the filtering material 17 around each aperture 13. In the past it has been the practice to apply the adhesive to only a portion of the support wires in either strips or intermittent spots. Such application of the adhesive is not as desirable as the bath application of the present invention because it is less likely to provide a proper seal between the web 10 and the filtering material 17 and because it does not provide a protective covering to the entire web. However, it was heretofore felt that such a strip or spot application was preferable in order to avoid a plugging of the apertures of the web with adhesive. After the web 10 has passed through the adhesive bath 25 doctor rolls 26 receive the web 10 and remove any excess adhesive.

The filtering material or filter media 17 is drawn off in a continuous sheet from the supply roll 27 and sprayed with a coating on one side, which might best be described as its inlet side 28, by a spraying apparatus 29. The spray is preferably tri-cresyl phosphate. The spray coating during operation of the filter cartridge causes particles in the air flowing through the media to collect and stick on the filtering material. The sprayed media 17 continuously passes over a so called "nip" roll 30 as the coated web 10 is continuously drawn from the adhesive applicator 25 and over the nip roll 30 with the media 17 running between the nip roll 30 and the web 10. The nip roll 30 angularly deflects the moving path of both the web 10 and the sheet of media 17 to maintain tension in the lines. This tension provides the necessary pressure between the media 17 and the coated web 10 to insure the proper gluing therebetween. It should be noted that the unsprayed or outlet side 31 of the filtering material 17 is secured to the web 10 with the support wires 12 positioned between the material 17 and the support wires 11. As will be seen more clearly from the following description, this positioning of the support wires 11 and 12 with respect to each other and with respect to the media material 17 has the distinct advantage of maintaining the support wires 12 in the proper supporting position in the event of a faulty weld between the support wires. The assembled material and support web is then carried over an elevated roll 32 and past a plurality of infra-red heaters 33 which are adapted to cure the adhesive. It has been found that the curing of the adhesive generally enhances the water resistant qualities of the coating on the web.

The assembled filtering material 17 and support web 10 are fed by pull rolls 34 into the folding or pleating apparatus illustrated in FIG. 1 and generally designated 35. These pull rolls 34 also maintain a desired back force on the assembled material passing into the folding apparatus to insure proper folding of the assembled material. The folding apparatus may include a pair of roller chain assemblies 36 and 37 mounted in spaced relationship one from the other and mechanically driven at the same rate of linear advancement by any convenient mechanical means (not shown). A radius pointed T-shaped bar 38 is mounted on each link of the roller chain of assembly 36 and a radius T-shaped bar 38a is mounted on each link of the roller chain of assembly 37. It should be noted that the radius of the bars 38 is larger than that of the bars 38a. As the roller chain assemblies 36 and 37 advance from left to right, as viewed in FIG. 1, and the assembled filtering material and support web is fed from left to right into the apparatus, each support wire 11 is sinusoidally bent or folded by the bars 38 and 38a. Each bar 38 associated with assembly 36 fits between a pair of folds or pleats on the media side of the assembled media and web, and each bar 38a associated with assembly 37 fits in between adjacent folds or pleats on the web side of the assembled media. The larger radius bars 38 on the media insure sufficient spacing between the pleats on this side of the assembled media and web and thereby maximize the dust collecting surface area. As the chain assemblies 36 and 37 separate the pleated assembly of support web and filtering material is supported by table 39. The folded integrated assembly forms a continuous length of filter which may then be chopped off by a cutting apparatus 40 to the desired length to provide a filter panel, generally designated 41, for mounting in a frame hereinafter described.

The frame for supporting the folded filtering material and support web in a completed assembly is shown in FIGS. 2, 3, 4 and 5, and is generally designated 42. The frame 42 is hereinafter described as being constructed of cardboard, but it is to be understood that the term "cardboard" is intended to include such inexpensive materials as chipboard, paperboard, cardboard or certain plastic materials which can be cut-scored and folded in the manner hereinafter described. The frame 42 may be constructed of a flat strip of cardboard appropriately cut and cut-scored for folding to form a sidewall 43 adapted to extend around the sides of the filter panel 41, with the lengthwise edges 44 folded 90° over the perimeter of the front and back of the panel 41 and thereby defining a cartridge air inlet 45 and cartridge air outlet 46, respectively. The filter panel 41 is positioned between the air inlet 45 and air outlet 46 with the sprayed media surface 28 side of the panel extending across the air inlet 45 and the support web 10 side of the panel extending across the air outlet 46. The inner surface of the frame sidewall 43 is sealably secured to the sides and edges of the filtering material 17 by adhesive or other means to prevent a leakage of air therebetween.

The assembled frame 42, support web 10 and filtering material 17 forms the air filter cartridge which may be mounted in the air inlet duct (or frame thereof) of the air conditioning or air supply system. The air filtering cartridge is mounted in the air inlet duct such that the direction of flow of air through the panel 41 is from the air inlet 45 and away from the back side of the support wires 11 out the air outlet 46 as shown by the directional arrows 47 in FIG. 3. As noted previously, the support wires 12 are between the media 17 and the sinuous support wires 11. Thus, in the event of a faulty weld between a support wire 11 and a support wire 12, the less rigid straight support wire 12 will be maintained in position by the more rigid sinuous support wire 11. The air flows through the filtering material and through apertures 13 between the support wires 11 and 12. Since the filtering material is secured by adhesive to the wires surrounding each aperture 13, the filtering material will not billow through the apertures 13.

The modified form of support web 100 as shown in FIG. 7 is substantially identical to the heretofore described support web 10 except in that the straight support wires 112 are not positioned across the sinuous wire support 111 in randomly spaced parallel planes. Instead, the straight support wires 112 are located at the peaks 113 and valleys 114 of the sinuous support wires 111 to provide sufficient support to the filtering material 117 while maximizing the space between the straight support wires 112 and thereby decreasing the number of straight support wires 112 in the filter cartridge.

Thus, by this invention, a relatively inexpensive air filtering cartridge is produced which economically may be disposed of after the filtering material has become sufficiently clogged to be ineffective. In addition, sufficient support for the relatively flexible pleated media is provided by a fire-resistant and rust-resistant support structure which is economically produced from inexpensive materials and by relatively rapid and inexpensive steps.

Having fully described my invention, it is to be understood that I do not wish to be limited to the details herein set forth, but my invention is of the full scope of the appended claims.

I claim:

1. A disposable filter cartridge for mounting an air inlet duct, comprising:

a frame for mounting in the air inlet duct;

a filter panel mounted on said frame and extending thereacross, said panel including a flexible sheet of pleated filtering material and a corresponding pleated support web adhesively joined to said filtering material;

said web including a plurality of spaced sinuous wire supports and a plurality of spaced straight wire supports connected to said sinuous wire supports and forming plurality of apertures therebetween;

said sinuous wire supports extending across said pleats of said filtering material and coinciding therewith to provide lateral support thereto and said straight wire supports extending along said pleats of said filtering material and transversing said sinuous wire supports to provide longitudinal support thereto; and said straight wire supports positioned between said filtering material and said sinuous wire supports (at said connection therewith) whereby said more rigid sinuous wire supports maintain said less rigid sinuous wire supports in position against said filtering material.

2. The filter cartridge of claim 1, wherein said support web is secured to the downstream side of said filtering material.

3. The filter cartridge of claim 1, wherein said wire supports are metallic to provide a fire-resistant support web and said support web is completely coated with a protective coating to be rust resistant.

4. The filter cartridge of claim 1, wherein said sinuous wire supports each include alternately spaced bends which are more acute than the intervening adjacent bends whereby said filtering material secured to said sinuous wire supports includes corresponding acute upstream pleats and corresponding less acute downstream pleats.

5. The combination of claim 1 wherein said sinuous wire support and said straight wire support define a plurality of apertures along each of said pleats defined by said filter panel.

6. The filter cartridge of claim 1 wherein each of said sinuous wire supports has alternately spaced more acute bends than the intervening adjacent bends whereby said upstream pleats of said panel are more acute than said downstream pleats to enhance the collecting capacity of the filter cartridge.

7. The filter cartridge of claim 1, wherein said filtering material is secured to said wire supports around each said aperture to prevent a billowing of said filtering material through said apertures.

8. The filter cartridge of claim 7, wherein said filtering material and said wire supports are secured by an adhesive seal extending completely around each said aperture.

9. The filter cartridge of claim 8, wherein said sinuous wire supports and said straight wire supports are spaced sufficiently close together to provide the necessary support for said filtering material and form sufficiently large apertures to prevent said adhesive from bridging thereacross and clogging said apertures.

10. The filter cartridge of claim 1, wherein said sinuous wire supports are equally spaced and parallel and said straight wire supports are equally spaced and parallel and connect at right angles to said sinuous wire supports.

11. The filter cartridge of claim 10, wherein certain of said straight wire supports are connected at the peaks of said sinuous wire supports and said other straight wire supports are connected at the valleys of said sinuous wire supports.

* * * * *